US006894274B2

(12) United States Patent
Valant-Spaight

(10) Patent No.: US 6,894,274 B2
(45) Date of Patent: May 17, 2005

(54) ESTIMATION OF FORMATION POROSITY USING WATER MEASUREMENT

(75) Inventor: Bonnie Valant-Spaight, Houston, TX (US)

(73) Assignee: PathFinder Energy Services, Inc., Houston, TX (US)

( * ) Notice: Subject to any disclaimer, the term of this patent is extended or adjusted under 35 U.S.C. 154(b) by 195 days.

(21) Appl. No.: 10/317,987

(22) Filed: Dec. 11, 2002

(65) Prior Publication Data

US 2004/0113061 A1 Jun. 17, 2004

(51) Int. Cl.$^7$ ................................................ G01V 5/10
(52) U.S. Cl. ................................ 250/269.4; 250/269.1
(58) Field of Search ..................... 250/269.4, 269.1, 250/266, 265, 254

(56) References Cited

U.S. PATENT DOCUMENTS

| | | |
|---|---|---|
| 3,483,376 A | 12/1969 | Locke et al. |
| 3,491,238 A | 1/1970 | Allen |
| 3,509,342 A | 4/1970 | Dewan |
| 3,942,004 A | 3/1976 | Kehler |
| 4,035,639 A | 7/1977 | Boutemy et al. |
| 4,047,027 A | 9/1977 | Bateman et al. |
| 4,379,228 A | 4/1983 | Allen |
| 4,423,323 A | 12/1983 | Ellis et al. |
| 4,524,274 A | 6/1985 | Scott |
| 4,909,075 A | 3/1990 | Flaum et al. |
| 4,910,397 A | 3/1990 | Mills, Jr. et al. |
| 4,973,839 A | 11/1990 | Nelligan |
| 5,051,581 A * | 9/1991 | Hertzog et al. ............. 250/266 |
| 5,175,429 A | 12/1992 | Hall, Jr. et al. |
| 5,469,736 A | 11/1995 | Moake |
| 5,486,695 A | 1/1996 | Schultz et al. |
| 5,668,369 A | 9/1997 | Oraby |
| 5,684,294 A | 11/1997 | Kouhi |
| 5,684,299 A * | 11/1997 | DasGupta ................. 250/269.2 |
| 5,767,510 A | 6/1998 | Evans |
| 6,207,953 B1 | 3/2001 | Wilson |
| 6,285,026 B1 * | 9/2001 | Evans et al. .............. 250/269.4 |
| 2003/0057366 A1 * | 3/2003 | Gzara et al. ............. 250/269.3 |

OTHER PUBLICATIONS

D. Best, P. Wraight, and J. Holenka, "An Innovative Approach to Correct Density Measurements While Drilling for Hole Size Effect," Society of Professional Well Log Analysts Thirty–First Annual Logging Symposium Transactions, Jun. 24–27, 1990, Paper G.

W. C. Paske, M. V. Rao, J. R. Twist, S. G. Mack, and R. L. Spross, "Theory and Implementation of Borehole Caliper Measurement Made While Drilling," Society of Petroleum Engineers Annual Technical Conference, Sep. 23–26, 1990, paper SPE 20562.

R. A. Rosthal, D. L. Best, and B. Clark, "Borehole Caliper While Drilling from a 2–MHZ Propagation Tool," Society of Petroleum Engineers Annual Technical Conference, Oct. 6–9, 1991, paper SPE 22707.

* cited by examiner

*Primary Examiner*—Otilia Gabor

(57) ABSTRACT

Methods and systems for enabling estimations of porosity that are less sensitive to standoff and borehole size effects, and less reliant on corrective techniques for such effects. In one embodiment, a method is provided for estimating porosity of a formation using a downhole neutron tool. The method includes obtaining a near count rate in water, obtaining a far count rate in water, obtaining a near count rate in the formation and a corresponding far count rate in the formation, subtracting the near count rate in water from the near count rate in the formation to form an adjusted near count rate, subtracting the far count rate in water from the far count rate in the formation to form an adjusted far count rate, and estimating a formation porosity value as a function of the adjusted near count rate and the adjusted far count rate.

40 Claims, 6 Drawing Sheets

ESTIMATION OF FORMATION POROSITY USING WATER MEASUREMENT

FIELD OF THE INVENTION

This invention, in the exemplary embodiments, relates in such embodiments to the field of well logging; in particular, it relates to methods and apparatus for deriving the porosity of the earth formations surrounding a borehole; and more particularly, it relates in such embodiments to systems that analyze data obtained by dual-neutron detectors to derive a measure of the porosity of sections of earth formations traversing portions of a borehole.

BACKGROUND OF THE INVENTION

During the subterranean drilling process, measurements of the porosity of earth formations surrounding a borehole are conventionally made to locate and characterize, for example, hydrocarbon reservoirs. These measurements can be made while the bore is being drilled using techniques known as logging-while-drilling (LWD) or measurement-while-drilling (MWD). One method for measuring porosity involves deploying a tool within a borehole with a neutron source and two neutron detectors that are spaced away from the source. Fast neutrons emitted into the formation from the neutron source tend to slow down more in formations having higher porosity. Thus, the rate of neutrons reaching the neutron detectors after traveling through a formation ("count rates"), is an indicator of a formation's porosity.

The estimation of formation porosity based on the neutron count rates can be adversely affected by borehole standoff especially in the presence of drilling fluid. Standoff refers to the space between a neutron source and the wall of borehole, which is typically filled with drilling fluid that tends to absorb fast neutrons at a rate greater than the surrounding formation. For similar reasons, effects due to particularly large borehole diameters can be problematic in estimating formation porosity.

In order to minimize standoff effects, prior art neutron detector systems commonly use mechanisms that extend to press a neutron source against the surface of a borehole; however, such methods are typically used in wire-line logging systems. The practical considerations, such as a moving drill string, encountered in LWD and MWD systems make solutions that press the neutron source against the surface of a borehole more difficult to implement. In contrast to wire-line logging, the location of a dual-neutron detector tool within a borehole during LWD and MWD operations is typically dictated by the drilling operation and thus control of the standoff is limited. In addition, LWD and MWD operations often require measurements to be taken while the drill string rotates causing the neutron source to rotate and cause a standoff that is widely variable.

Prior art systems commonly provide corrective techniques to compensate porosity estimates for the effects of standoff and borehole size. These techniques often call for ultra-sonic transducers that measure the actual standoff and bore size as measurements are made. In certain situations that can arise in LWD and MWD operations, these transducers may not always be reliable. Thick circulating drilling fluid can make it difficult for a transducer to discern the mud from the wall surface of a borehole. The inset to the transducer may intermittently become "packed-off" by becoming filled with solid material. If the drilling fluid is changed while drilling is in progress, the effectiveness of the corrective techniques that are dependent on knowing certain mud properties, may be diminished. Furthermore, the tolerance of each standoff correction is commonly a percentage of the standoff correction. Thus, in the situation where a standoff correction is substantial compared to the uncorrected porosity measurement, the certainty of the corrected porosity measurement is diminished.

There is therefore a need for reliable, inexpensive measuring tools and methods for obtaining the porosity of sections of earth formations traversing portions of a borehole that are less sensitive to the effects of borehole size and standoff. In this way, reliance on corrective techniques (and the precision of corrective techniques) for these effects would be reduced.

SUMMARY OF THE INVENTION

In accordance with one aspect of the invention, a method is provided for estimating the porosity of a formation using a borehole tool that includes a neutron source, a near detector and a far detector. The method comprises obtaining a near count rate in water, obtaining a far count rate in water, obtaining a near count rate in the formation and a corresponding far count rate in the formation, subtracting the near count rate in water from the near count rate in the formation to form an adjusted near count rate, subtracting the far count rate in water from the far count rate in the formation to form an adjusted far count rate, and estimating a formation porosity value as a function of the adjusted near count rate and the adjusted far count rate. This method may include applying a transfer function to the adjusted near count rate and far count rate, wherein the transfer function is determined, at least in part, by measuring matched pairs of near count rates and corresponding far count rates in formations having known porosities.

In accordance with a second aspect of the invention the method described above yields a first estimated formation porosity value as function of the adjusted near count rate and the adjusted far count rate. The method may further include estimating a second estimated formation porosity value as a second function of the near count rate and the far count rate, and computing a third estimated formation porosity value as a function of the first and second estimated formation porosity values. According to another aspect of the invention the method above may include applying the transfer function to the ratio of the adjusted near count and the adjusted far count.

According to another aspect of the invention, a system is provided to estimate porosity of a formation, comprising a dual detector neutron tool. The tool is disposed to measure a near count rate in the formation and a corresponding far count rate in the formation. The tool further includes a processing unit. The processing unit is disposed to be communicatively coupled to the tool. The processing unit has access to the near count rate for the tool in water and the far count rate for the tool in water. The processing unit is further disposed to receive the near count rate in the formation and the corresponding far count rate in the formation, subtract the near count rate in water from the near count rate in the formation to form an adjusted near count rate, subtract the far count rate in water from the far count rate in the formation to form an adjusted far count rate, and estimate a formation porosity value as a function of the adjusted near count rate and the adjusted far count rate.

According to another aspect of the invention, a processing unit is provided for estimating porosity of a formation, the processing unit including a memory to store a body of electronic information. The electronic information includes a near emitted-particle count rate in the formation, a corresponding far emitted-particle count rate in the formation, a near emitted-particle count rate in substantially 100% porosity, a corresponding far emitted-particle count rate in substantially 100% porosity, a program code and program data, and one or more processors communicatively coupled to the memory and configured to retrieve and process the electronic information. Program code and the program data are configured to direct the one or more processors to receive the near emitted-particle count rate in the formation and the corresponding far emitted-particle count rate in the formation, subtract the near emitted-particle count rate in water from the near count rate in the formation to form an adjusted near emitted-particle count rate and to subtract the far emitted-particle count rate in water from the far emitted-particle count rate in the formation to form an adjusted far emitted-particle count rate, and estimate a formation porosity value as a function of the adjusted near emitted-particle count rate and the adjusted far emitted-particle count rate.

According to another aspect of the invention, a data structure is provided, stored in a computer readable medium, the data structure including computed estimates of formation porosity values. The data structure is prepared by a process including obtaining a near count rate in water, obtaining a far count rate in water, obtaining a near count rate in the formation and a corresponding far count rate in the formation, subtracting the near count rate in water from the near count rate in the formation to form an adjusted near count rate, subtracting the far count rate in water from the far count rate in the formation to form an adjusted far count rate, and estimating a formation porosity value as a function of the adjusted near count rate and the adjusted far count rate.

According to another aspect of the invention, a computer program product is provided, storeable on a computer readable medium, the computer program product including processor readable logic for directing a processor to estimate formation porosity. The computer program product further includes program code and program data. The program code and data is configured to be loaded into a local memory and to further direct the processor to obtain a near count rate in water, obtain a far count rate in water, obtain a near count rate in the formation, obtain a corresponding far count rate in the formation, subtract the near count rate in water from the near count rate in the formation to form an adjusted near count rate, subtract the far count rate in water from the far count rate in the formation to form an adjusted far count rate, and estimate a formation porosity value as a function of the adjusted near count rate and the adjusted far count rate.

It is therefore a technical advantage of the invention to enable estimations of porosity that are less sensitive to standoff and borehole size. A further technical advantage of the invention is to enable increasingly accurate and reliable porosity estimates in LWD and MWD operations.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should be also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1A:
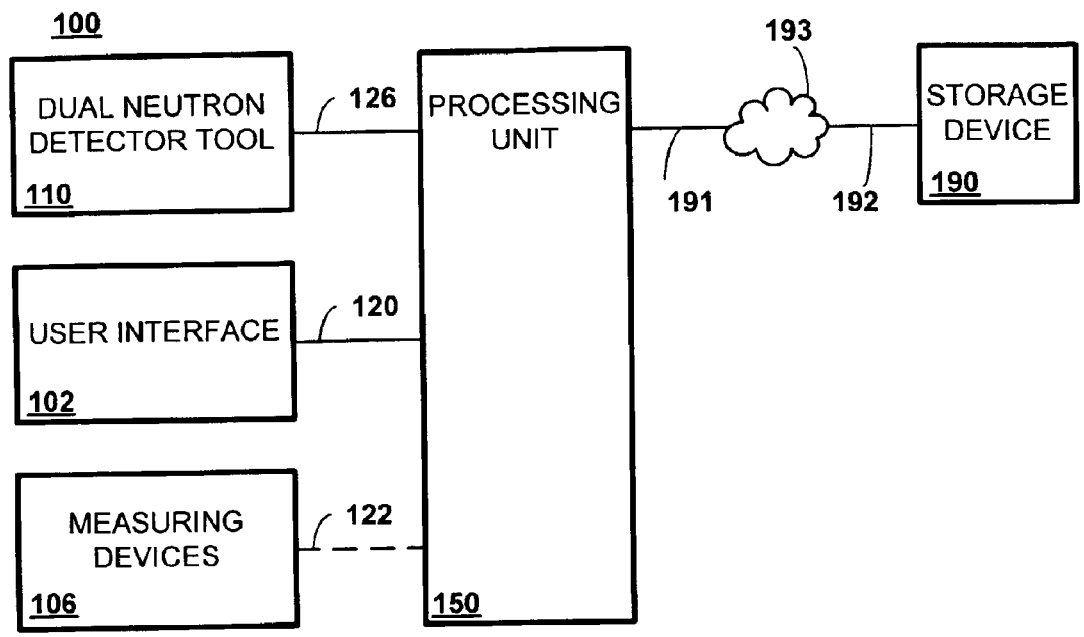
FIG. 1A is a schematic block diagram of an exemplary embodiment of a porosity estimating system of the present invention.

FIG. 1A depicts a block diagram of an exemplary embodiment of a porosity measuring system 100 on which the present invention may be deployed. Porosity measuring system 100 comprises a dual detector neutron tool 110 that is deployable within a borehole. Dual detector neutron tool 110 resides in a housing, which, in the exemplary embodiment, is a portion of a drill string adapted to be mechanically coupled to a drill collar to provide logging-while-drilling and measurement-while-drilling service. Dual detector neutron tool 110 includes an americium beryllium neutron source, a helium-3 near neutron detector, and a helium-3 far neutron detector. The near neutron detector is spaced away from the neutron source along the cylindrical axis of the borehole. The far neutron detector is spaced axially in the same direction as the near neutron detector, but further from the neutron source. In one exemplary embodiment, the center of near neutron detector is spaced 10.85 inches from the center of the source and the center of far neutron detector is spaced 24.97 inches from the center of the neutron source.

The near neutron detector and far neutron detector are each communicatively coupled to a microprocessor system that controls the acquisition of count data and includes a plurality of communication devices for receiving measured count data from the detectors and for preprocessing the data to sequentially generate, on path 126, a plurality of matched pairs of corresponding near count rates and far count rates. In the exemplary embodiment of FIG. 1B, path 126 comprises two serial communication links; one serial communication link is for transferring near count rates and the other for transferring far count rates.

In matching pairs of near and far count rates, each near count rate and corresponding far count rate indicate the rate in which neutrons are detected by the near neutron detector and far neutron detector, respectively, in one sample of porosity in a particular region of formation. It will be understood, however, by way of background, that matched pairs of corresponding near and far count rates may not necessarily be obtained during the exact same interval of time. In addition, by way of background, the particular region measured by a near count rate may not exactly coincide with the particular region measured by the corresponding far count rate. Temporal skews in obtaining corresponding pairs of near and far count rates are commonly known to occur. It will be understood that preprocessing may compensate by averaging exponentially weighted count data obtained over a range of intervals to compute each near and far count rate. In addition, spatial skew may result from the far detector investigating the formation at a greater depth and possibly offset from the zone of formation investigation of the near detector. Such preprocessing may also shift in time the specific interval of time in which a matched pair of near and far count reading are obtained so as to depth align the readings as the dual detector neutron tool 110 is moved through a borehole. Thus, with reference to the exemplary embodiment of FIG. 1A, depth alignment of readings may include delaying the time in which the near neutron detector is sampled so that it indicates the porosity of a region of the earth formation which closely coincide to the sample obtained by the far neutron detector. It will be appreciated that the foregoing discussion of exemplary preprocessing to compensate for temporal and spatial skew is by way of background only. The present invention processes matched pairs of corresponding near and far count rates with or without such processing, and it will be further understood that the invention is not limited in this regard.

With reference to FIG. 1A, optional measuring devices 106, maybe deployed in the housing, to generate dynamically measured data. Measuring devices 106 may include, for example, a transducer for measuring actual standoff and borehole size, and devices for measuring mud temperature and formation density.

In the exemplary embodiment illustrated in FIG. 1A, user interface 102 allows users to input preselected parameters such as mud properties or other environmental data to processing unit 150 via path 120, as well as tool specific data. Suitable user interfaces 102 include, for example, a keyboard or computer readable medium such a floppy diskette.

Still referring to FIG. 1A, porosity measuring system 100 further comprises a processing unit 150. Processing unit 150 receives on path 126 a plurality of matched pairs of corresponding near count rates and far count rates. Processing unit 150 also receives dynamically measured data on path 122 from optional measuring devices 106. Processing unit 150 further receives user-inputted data from the user interface 102 via path 120.

In accordance with the present invention, processing unit 150 computes estimates of the porosity of a formation, based on analysis of selected received matched pairs of corresponding near and far count rates. Processing unit 150 then records these computed estimates on storage device 190 via path 191. The artisan of ordinary skill will understand that numerous architectures are available for embodying a processing unit 150, and that the invention is in no way limited in this regard. For example, a suitable processing unit 150 may include at least one microprocessor and a memory for storing program code and program data that is specifically adapted to direct the microprocessor to compute estimates of the porosity in accordance with the present invention. Suitable processing units 150 may range in complexity from a highly integrated single microprocessor-based system to a plurality of interoperable microprocessors. Alternatively, a suitable processing unit 150 may be comprised of logic devices configured to compute an estimate of porosity, in accordance with the present invention.

With further reference to FIG. 1A, storage device 190 receives porosity estimates via path 192. Storage device 190 may be a computer readable medium such as volatile or non-volatile memory, an internal disk, magnetic tape, floppy diskette. Alternatively the information received by storage device 190 may be transformed into a plotted or printed image on paper, or other medium. The artisan of ordinary skill will appreciate that storage device 190 may include any device suitable to store the porosity estimates for subsequent retrieval. In addition, storage device 190 may be remote from processing unit 150 or it may be an integral part of processing unit 150.

It will be further appreciated with reference to FIG. 1A that numerous deployments of paths 191 and 192 are available, and that the invention is not limited in this regard either. For example paths 191 and 192 may be directly connected and may be implemented by a parallel data bus (such as processor bus; PCI bus, or SCSI bus) or a peripheral communications line (such as a serial communication line, parallel printer cable, or inferred communications link). Additionally, paths 191 and 192 maybe communicatively coupled through a device 193 which may include a computer or a communications network, such as a local area network, the Internet, or a telephone network. The artisan of ordinary skill will understand that paths 191 and 192 may be implemented with any combination of devices suitable for receiving and transferring data from processing unit 150 to the storage device 190.

Figure 1B:
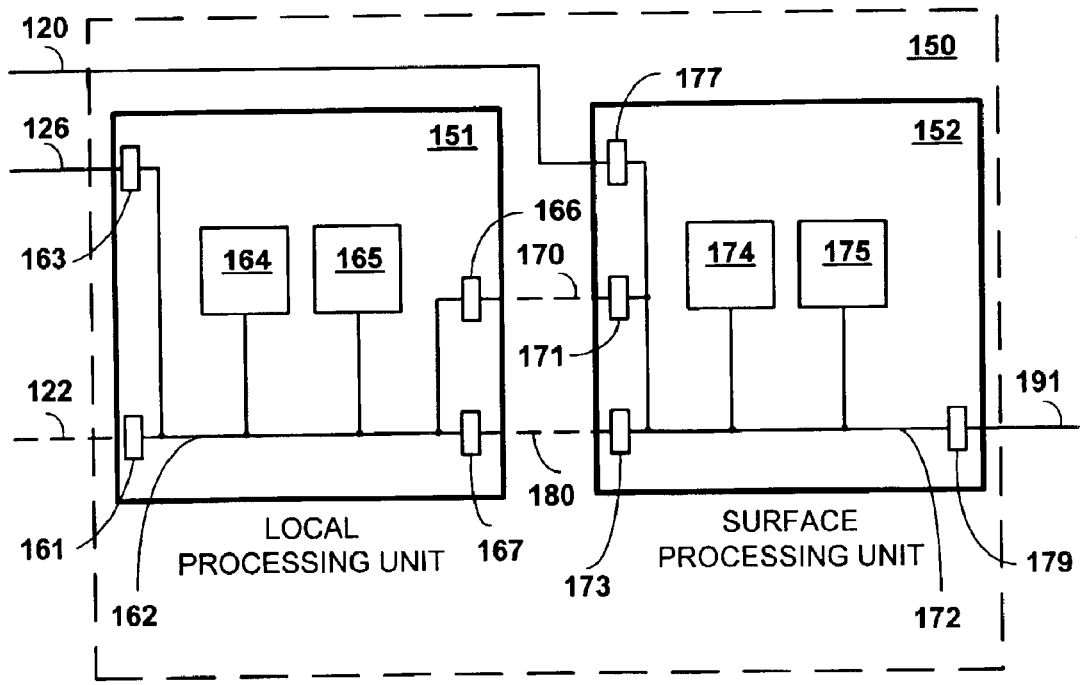
FIG. 1B is a schematic block diagram of an exemplary embodiment of a processing unit enabling the present invention.

FIG. 1B shows an exemplary embodiment suitable for processor unit 150 as shown in FIG. 1A. Processor unit 150, in this exemplary embodiment, is comprised of a local processing unit 151 and a surface processing unit 152. Local processing unit 151 is adapted to be deployed within a borehole and may reside in the same housing as the dual detector neutron tool 110. Surface processing unit 152 typically remains on the surface and may be communicatively coupled with local processing unit 151 to send and receive commands and/or data. Porosity estimates are computed in accordance with the present invention by local processing unit 151 and/or surface processing unit 152 for transfer to storage device 190.

Local processing unit 151, in the exemplary embodiment of FIG. 1B, is comprised of one or more local microprocessors 164 and a local memory 165, which are coupled through a local bus system 162. Local memory 165 comprises an array of non-volatile random access memory for storing downloadable program code and data, an amount of flash memory for storing logging data, and an array of random access memory for the temporary storage of data. Downloadable program code and data may include portions adapted to direct local processing unit to compute estimates of porosity in accordance with the present invention. Interface 163 comprises two serial ports for receiving matched pairs of corresponding near and far count rates from path 126. Serial port 161 provides an interface to paths 122 for receiving dynamically measured data. Interface 166 provides for down-hole communications between local processing unit 151 and surface processing unit 152 through path 170. Serial port 167 provides an interface to path 180 for a higher speed communications path with surface processing unit. Path 180 would generally not be available when local processing unit 151 is deployed down-hole.

Surface processing unit 152, in the exemplary embodiment, is comprised of one or more local microprocessors 174 and a local memory 175, which are communicatively coupled through a local bus system 172. The local memory 175 includes an array of random access memory, but may also include a hard drive, floppy drive, CD reader, magnetic tape reader or any other device suitable for storing measured data, program code and program data. The artisan of ordinary skill will appreciate that the invention is not limited in this regard. Program code and data may include portions adapted to direct local microprocessor 174 to compute porosity in accordance with the present invention. Interface 171 provides for down-hole communications through path 170. Interface 173 provides for communication through path 180. Interface 179 provides for the transfer of porosity estimates onto path 191. Interface 177 provides an interface to path 120.

While local processing unit 151, as shown on FIG. 1B, is deployed within a borehole, down-hole communication path 170 provides communication with surface processing unit 152. Path 170 may be any communications mechanism suitable for the purpose such as serial data link via an electric wire, or telemetry via the fluid-filled annulus of a drill string. Local processing unit 151 may receive commands and data from surface processing unit 152, through path 170. Path 170 may also be used to transfer data to the surface processing unit 152 such as matched pairs of corresponding near and far count rates and/or estimates of porosity. It will be appreciated that in some embodiments, data may be transferred to the surface processing unit 152 in substantially in "real-time" as counts rates are received or the porosity estimates are computed.

Alternatively, logging data may be accumulated while local processing unit 151 is deployed within a borehole. It will be appreciated that as matched pairs of corresponding near and far count rates are received on path 126, local processor unit 151 may add a time stamp to each matched pair and store the rates and time stamp in flash memory as logging data. Alternately or additionally, local processor unit 151 may store selected computed porosity estimates in flash memory as logging data.

While local processing unit 151 is on the surface, such as before or after down hole deployment, it may be communicatively coupled to surface processing unit 152, or its equivalent, through path 180, which may be any suitable data link that enables logging data to be retrieved from the local processing unit's flash memory and transferred to the surface processing unit 152. In the exemplary embodiment of FIG. 1B, path 180 is a detachable serial data link communications cable. Commands, program code, and data including user specified mud properties and environmental data may also be transferred to local processing unit 151 from surface processing unit 152 through path 180.

Surface processing unit 152 may track the location of the dual detector neutron tool 110 as it progresses through a borehole. Local processing unit 152 may provide a time stamp with each matched pair of corresponding near and far count rates. For matched pairs that are received either in real-time or as well as logging data, surface processing unit 152 may derive the physical location where each of the matched pair of count rate were sampled based on the associated time stamp.

In a first exemplary embodiment, surface processing unit 152 retrieves matched pairs of corresponding near and far count rates and computes porosity estimates in accordance with the present invention. In an second exemplary embodiment, surface processing unit 152 may be comprised of a first computer for retrieving logging data directly from local processing unit 151 and a second computer that is adapted to receive, from the first computer, logging data, including the matched pairs of corresponding near and far count rates, to compute estimates of porosity in accordance with the present invention.

Referring again to FIG. 1A, during normal LWD/MWD operation, the dual detector neutron tool 110 is deployed within a borehole. The neutron source included in tool 110 continually radiates neutrons into the surrounding formation. The near and far neutron detectors sample the population of neutrons that are returned to the borehole. It is well known that the change in rate in which a near neutron detector and a far neutron detector detect neutrons is a function of the separation of the near and far neutron detectors from the neutron source as well as the diffusion length. Diffusion length is unique for a specific porosity for a given formation. Thus, when the formation properties are known, a transfer function, pre-determined for a particular dual detector neutron tool, provides for estimates of porosity to be derived from matched pairs of corresponding near and far count rates.

Program code and data utilized by processing unit 150 to compute porosity in accordance with the present invention may include a transfer function for translating near and far count rates into porosity estimates. In general, transfer functions are specific to the particular spacing between detectors and source and particular type of dual detector neutron tool. Transfer functions may be determined based on laboratory or field test on formations of known composition and known porosity and may be represented by a tabulation of data points that is interpolated and extrapolated to form a curve representing the relationship of porosity to a matched pair of near and far count rates. Porosity estimates derived using a transfer function may subsequently be corrected to account for errors, such as those incurred as a result of bore-hole effects, mud properties, or environmental considerations. Alternatively, transfer functions may be comprised of a plurality of functions where, for example, one function is selected for each application based on certain relevant mud properties and formation considerations. The effects of mud properties and formation considerations on porosity measurements are determinable by conventional techniques.

Figure 2A:
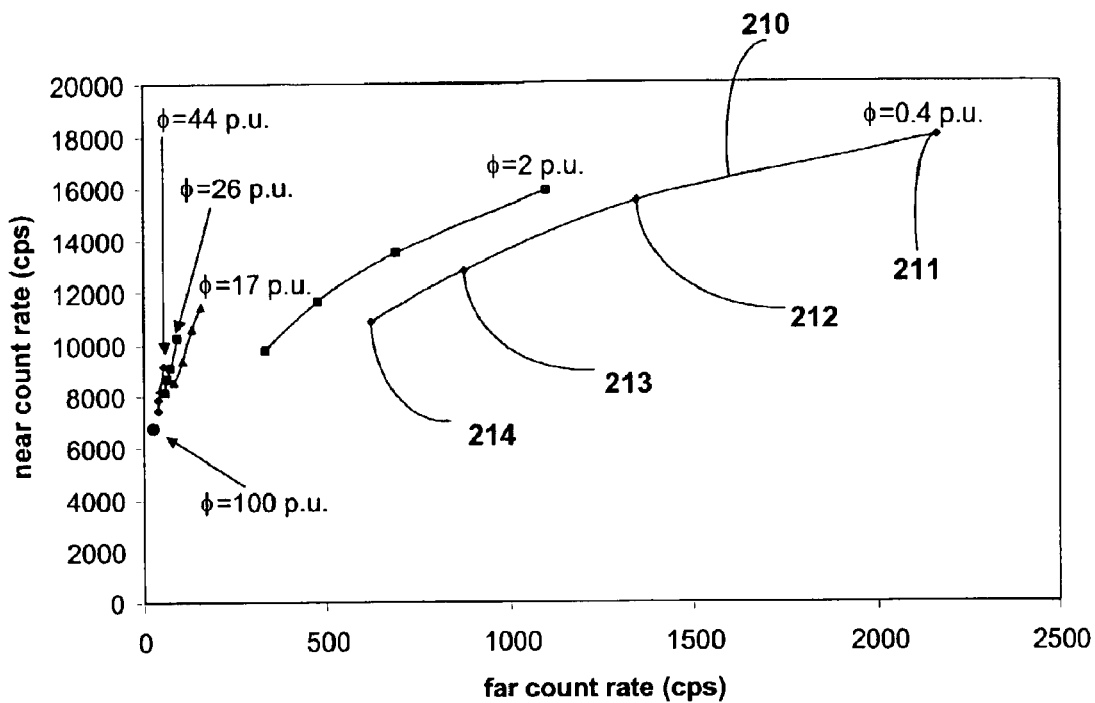
FIG. 2A depicts several plots of near count rates against far count rates for given constant actual porosity values measured at four different values of standoff.
Figure 2B:
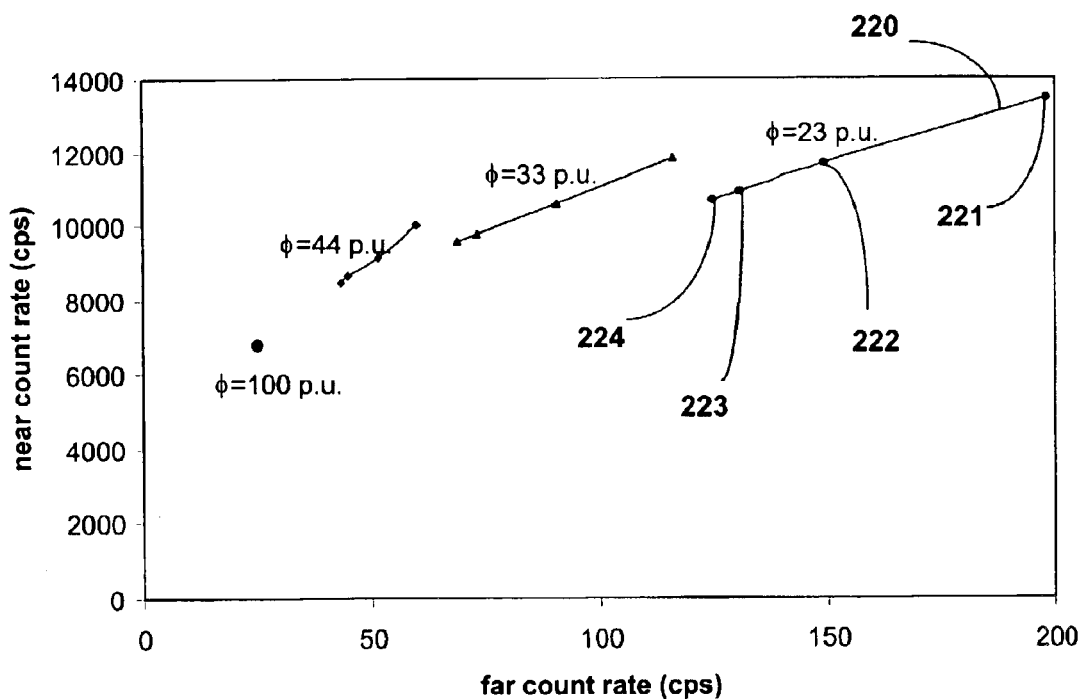
FIG. 2B depicts several plots of near count rates against far count rates for given constant actual porosity values measured at four different values of borehole diameter.

FIGS. 2A and 2B illustrate the relationship between near count rates, far count rates and selected discrete values of actual porosity for a particular embodiment of dual detector neutron tool 110. The graphs shown in FIGS. 2A and 2B are derived from actual measurements. FIG. 2A depicts several plots of near count rates against far count rates for given constant actual porosity value. Each plot is interpolated from four points that are each an actual near count rate and an actual far count rate measured at four different values of standoff. The highest point on each line represents the near and far count rates with no standoff and each subsequent point represents standoff increases of 0.5 inches. For example, line 210 represents actual porosity value of 0.40 porosity units (p. u.). Point 211 is with no standoff, point 212 is with 0.50 inches of standoff, point 213 is with 1.00 inches of standoff, and point 214 is with 1.50 inches of standoff.

FIG. 2B depicts several plots of near count rates against far count rates, again for given constant actual porosity values. In this case each plot is interpolated from four points that are each an actual near count rate and an actual far count rate measured at four different values of borehole size. For example, line 220 represents constant porosity value of 0.4 p.u. Point 221 is with borehole diameter of 6 inches, point 222 is with a borehole diameter that is 8 inches, point 223 is with a borehole diameter that is 12 inches and point 224 is with a borehole diameter that is 16 inches.

The graphs of FIGS. 2A and 2B illustrate that a particular set of matched near and far count rates may correspond to a range of actual porosity values, but those near and far count rates will be affected by variables such as standoff and borehole size at the time the near and far count rates are sampled. However, FIGS. 2A and 2B also illustrate a trend.

It will be seen that as values for standoff or borehole diameter are increased, the plots of near rates versus far count rates tend to approach the graph expected value for 100 porosity units (i.e. 100% porosity, such as when the tool might be immersed in water).

Figure 3:
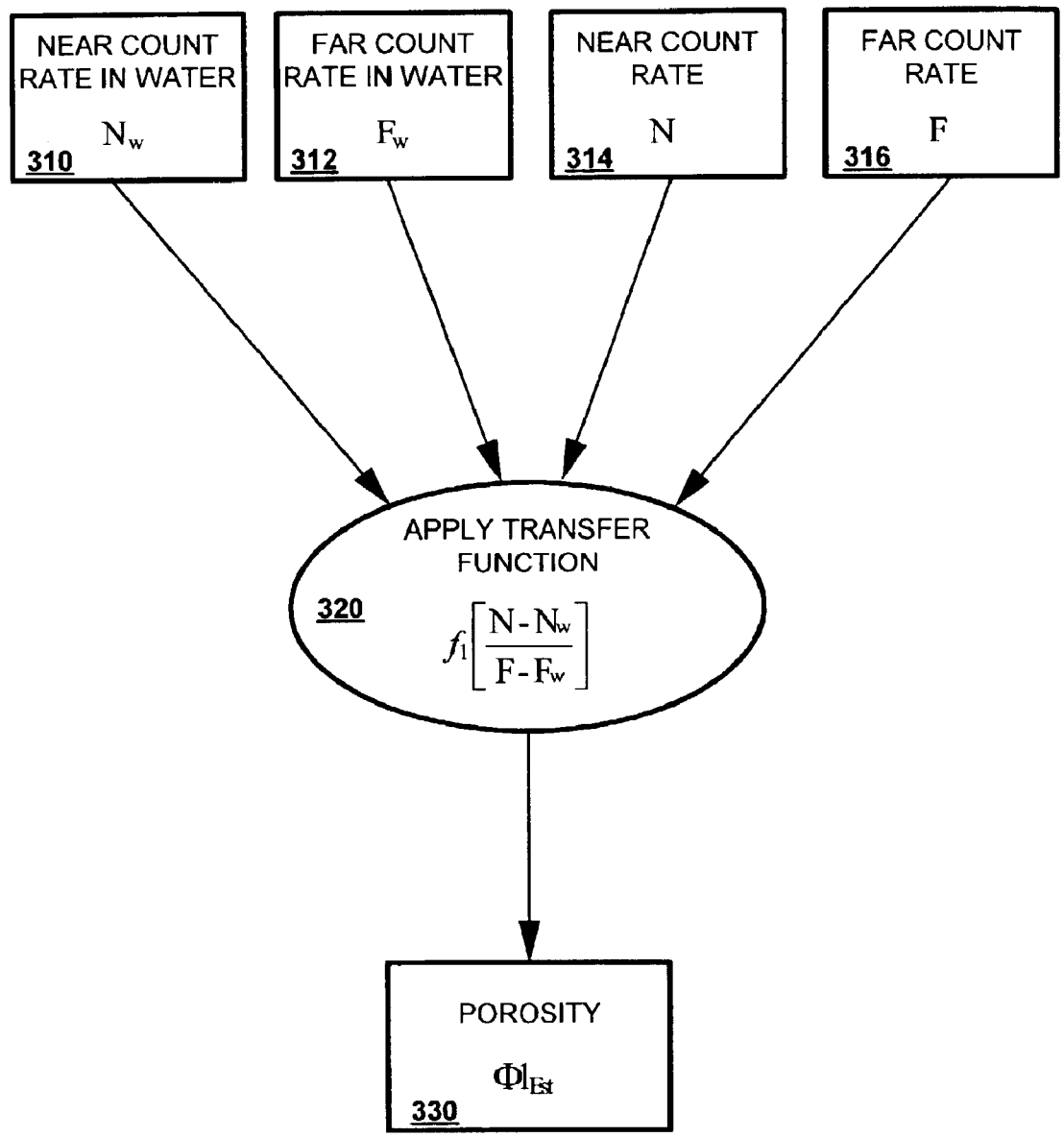
FIG. 3 is a flow diagram illustrating an exemplary method according to the present invention.
Figure 4A:
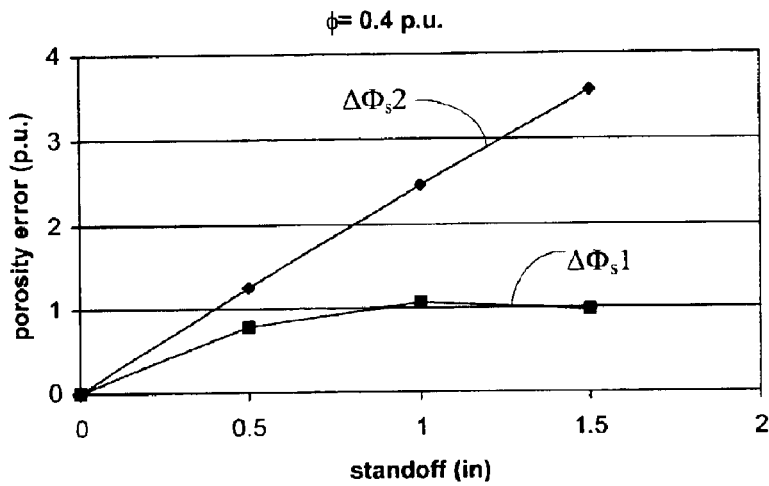
FIGS. 4A through 4E depict several plots, based on actual measurements illustrating standoff error.
Figure 4B:
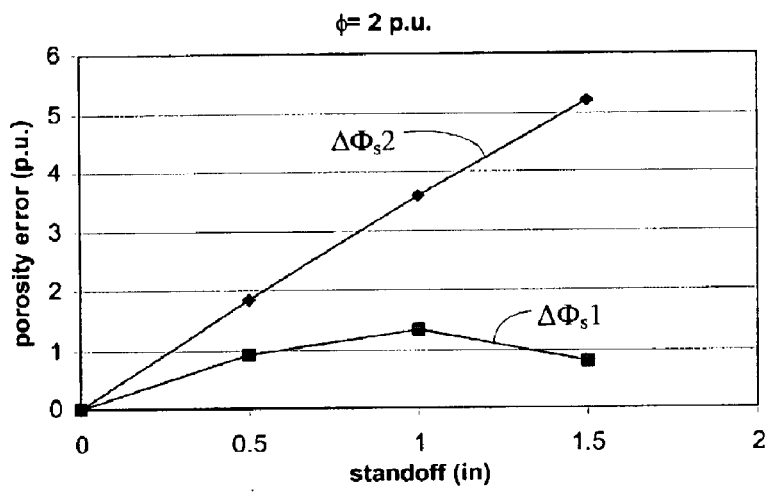
Figure 4C:
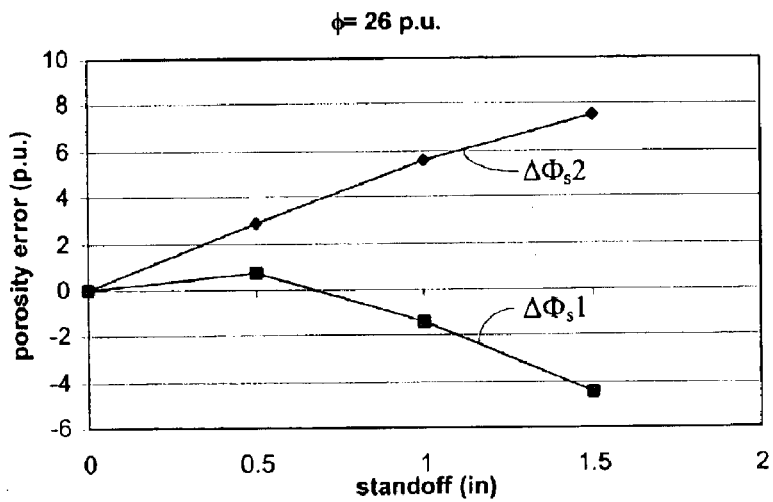
Figure 4D:
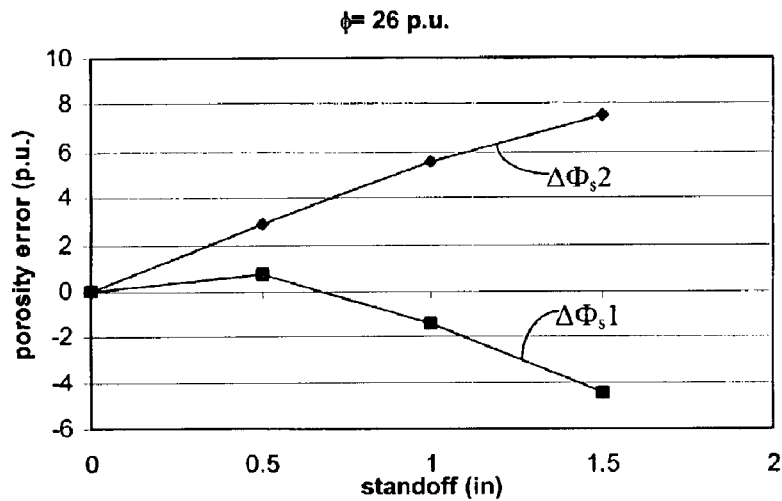
Figure 4E:
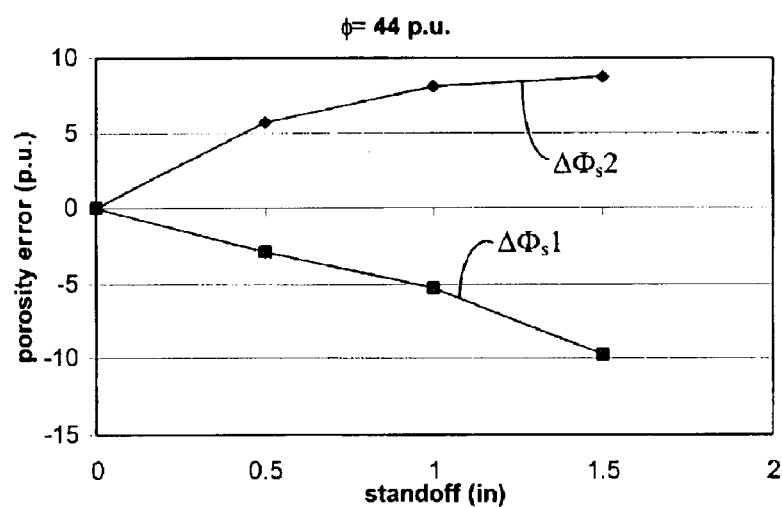

FIG. 3 illustrates a method 300 for estimating porosity in accordance with the present invention. Method 300 takes advantage of the trend shown in FIGS. 2A and 2B to enable estimation of porosity that tends to be less sensitive to the effects of standoff and borehole size. Steps 314, 316 require a matched pair comprising a near count rate N and a corresponding far count rate F to be obtained. Suitable count rates N and F may be obtained from a measuring device such as the dual detector neutron tool 110 or retrieved from storage or memory such as a magnetic tape, bard drive, floppy drive, computer memory or other suitable mechanism. Steps 310 and 312 of method 300 require the near count rate in water $N_w$ and the far count rate in water $F_w$ in water to be obtained. The near count rate in water $N_w$ and far count rate in water $F_w$ are typically constant for each dual detector neutron tool 110 and are commonly measured during the tool calibration process by immersing the dual detector neutron tool 110 in an essentially 100% porosity environment (such as water) and measuring the near count rate to obtain $N_w$ and the far count rate to obtain $F_w$. These constants may be an integral part of the program code and program data that directs processing system 150 to compute porosity in accordance with the present invention, or they may be provided through a user interface, computer readable medium or other suitable mechanism.

Referring again to method 300 of FIG. 3, step 310 comprises adjusting the near count rate N by subtracting the near count rate in water $N_w$ to form an adjusted near count rate, adjusting the far count rate F by subtracting the far count rate in water $F_w$ to form an adjusted far count rate, and applying a transfer function $f_1$ to the ratio of the adjusted near and far count rates to compute an estimated value for porosity $\Phi 1_{Est}$ using the governing equation $$\Phi 1_{Est} = f_1\left[\frac{N - N_w}{F - F_w}\right] \quad (1)$$

where N is the near count rate; $N_w$ is the near count rate in water; F is the corresponding far count rate; $F_w$ is the far count rate in water; $f_1$ is a transfer function, which may incorporate certain mud properties and formation considerations.

An error component $\Delta\Phi_d 1$ may subsequently be determined based on borehole diameter, and an error component $\Delta\Phi_s 1$ may subsequently be determined based on standoff. $\Delta\Phi_s 1$ and $\Delta\Phi_d 1$ are determined based on stored data of known relationships between the magnitude of borehole diameter and standoff to porosity measurement error. A porosity estimate $\Phi 1$ may then be derived by the equation $$\Phi 1 = \Phi 1_{Est} + \Delta\Phi_s 1 + \Delta\Phi_d 1 \quad (2)$$

A second method for deriving an estimate of porosity based on a near count rate N and a corresponding far count rate F, is to determine a transfer function $f_2$, for the particular dual detector neutron tool 110. $\Phi 2_{Est}$ is derived using the equation $$\Phi 2_{Est} = f_2\left[\frac{N}{F}\right] \quad (3)$$

where N is the near count rate; F is the corresponding far count rate; $f_2$ is a transfer function for deriving an estimate of porosity $\Phi 2_{Est}$, which may incorporate certain mud properties and formation considerations.

An error component $\Delta\Phi_d 2$ may subsequently be determined based on borehole diameter and error component $\Delta\Phi_s 2$ may subsequently be determined based on standoff. $\Delta\Phi_s 2$ and $\Delta\Phi_d 2$ are determined based on stored data of known relationships between the magnitude of borehole diameter and standoff to porosity measurement error. An estimation of porosity $\Phi 2$ may be then derived by the equation $$\Phi 2 = \Phi 2_{Est} + \Delta\Phi_s 2 + \Delta\Phi_d 2 \quad (4)$$

Figure 5A:
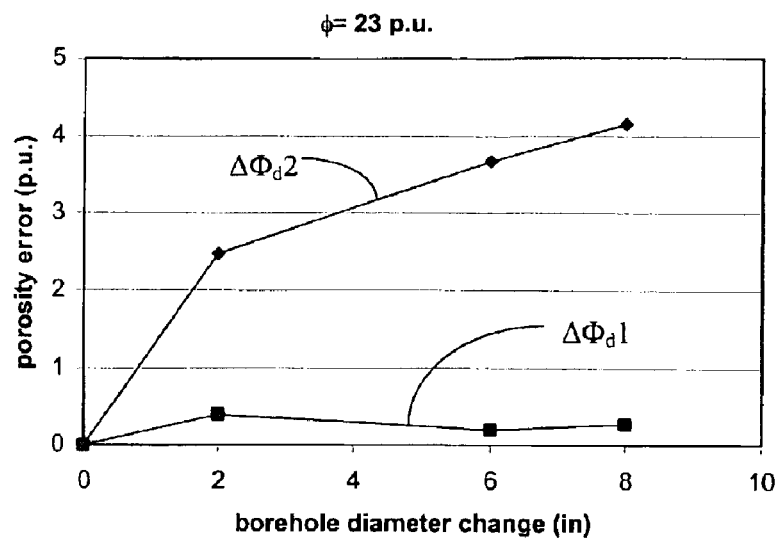
FIGS. 5A through 5C depict several plots, based on actual measurements illustrating borehole error.
Figure 5B:
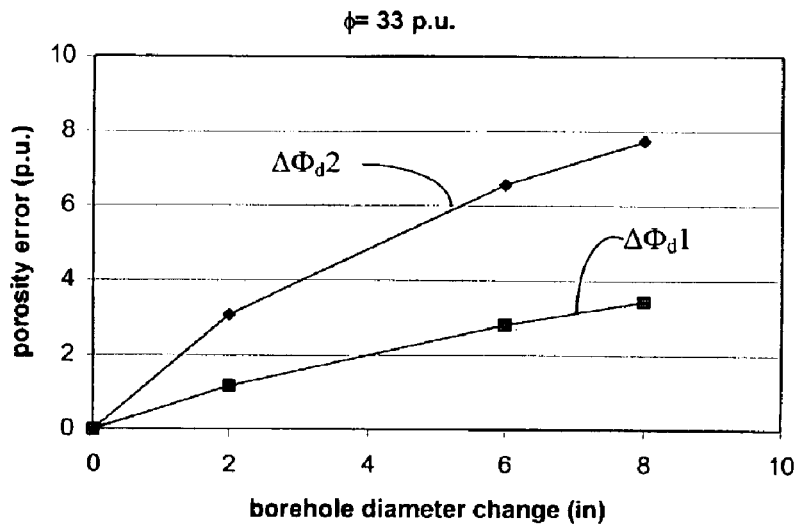
Figure 5C:
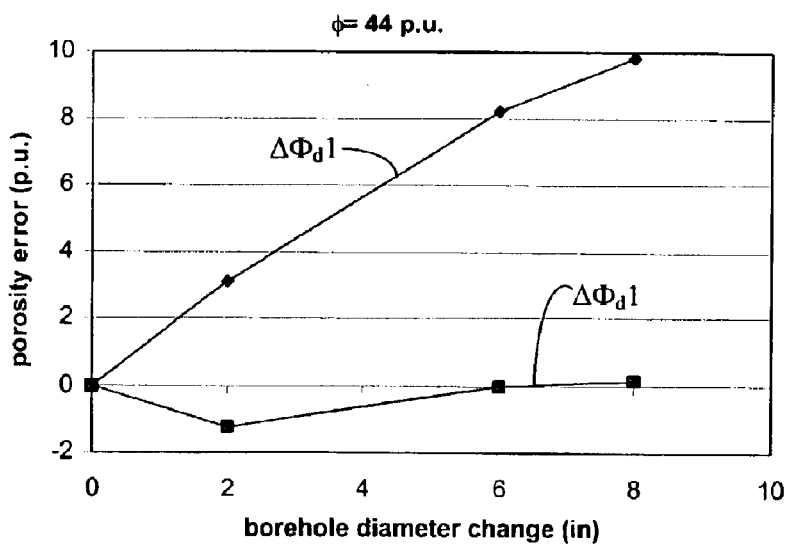

FIGS. 4A through 4E and 5A through 5C illustrate families of curves that are based on actual measurements obtained by an exemplary dual detector neutron tool such as tool 110 described and illustrated above. These FIGURES show exemplary relative magnitudes between error components due to standoff $\Delta\Phi_s 1$ and $\Delta\Phi_s 2$, and due to borehole size $\Delta\Phi_d 1$ and $\Delta\Phi_d 2$. FIGS. 5A through 5C show that porosity estimates derived using equation (1) tend to be less sensitive to borehole size than porosity estimates derived using equation (3). FIGS. 4A through 4E show that porosity estimates $\Phi 1_{Est}$ determined using equation (1) tend to be less sensitive to standoff than porosity estimates $\Phi 2_{Est}$ determined using equation (3). This general effect is particularly pronounced on FIGS. 4A through 4E when measured porosity values are 26 p.u. or below. It will be appreciated that this tendency for estimates of porosity $\Phi 1_{Est}$ computed using equation (1) to be less sensitive to standoff, as compared to estimates of porosity $\Phi 2_{Est}$ computed using equation (3), is consistent with the graphs shown in FIGS. 2A and 2B, in that FIGS. 2A and 2B were noted above to show a trend where plots of the near count rate verses far count rate approached those expected for the tool in water as standoff and borehole diameter are increased.

Referring still to FIGS. 4A through 4E, for porosity levels in the range of 44 p.u. and above, porosity estimates $\Phi 1_{Est}$, $\Phi 2_{Est}$ determined using equation (1) and (3) tend to yield error components due to standoff $\Delta\Phi_s 1$, $\Delta\Phi_s 2$ that are of similar magnitude but of opposite sign. For porosity levels in the higher ranges, such as above 44 p.u., a combination of equations (1) and (3) tends to yield a more accurate estimate of porosity $\Phi 3_{Est}$ than either equation alone. A third method for estimating porosity is to average the two estimations determined using equations (1) and (3) for select ranges of porosity. Measured porosity $\Phi 3_{Est}$ may be derived by the following equation $$\Phi 3_{Est} = \left(\frac{\Phi 1_{Est} + \Phi 2_{Est}}{2}\right) \quad (5)$$

Weighting factors may be incorporated in to equation (5) to achieve greater certainty in deriving estimates of porosity. A plurality of ranges is defined. The range may be based on either equation (1), equation (3), an average of each, or another method. Alternatively, weighting factors may be specified by a function that defines a curve relating weights to estimate porosity rather then selecting discrete values for specifically defined regions. Estimated porosity $\Phi 3_{Est\text{-}range}$ may be derived by the following equation $$\Phi3_{Est\text{-}range} = W1_{range}\Phi1_{Est} + W2_{range}\Phi2_{Est} \quad (6)$$

where $W1_{range} + W2_{range} = 1$.

Another example selects ranges to be defined based on equation (3); range 1 is defined to include $\Phi2_{Est} < 26$; range 2 is defined to include $26 < \Phi2_{Est} < 44$; range 3 is defined to include $44 < \Phi2_{Est}$. Weighting factors are selected to result in porosity estimates for range 1 to be predominately based on equation (1) and for range 2 to be equally based on equation (1) and equation (3) and for range 1 to be primarily based on equation (3).

$$\Phi3_{Est\text{-}1} = W1_1\Phi1_{Est} + W2_1\Phi2_{Est} \quad (7)$$

$$\Phi3_{Est\text{-}2} = W1_2\Phi1_{Est} + W2_2\Phi2_{Est} \quad (8)$$

$$\Phi3_{Est\text{-}3} = W1_3\Phi1_{Est} + W2_3\Phi2_{Est} \quad (9)$$

where $W1_1 = 0.75$; $W2_1 = 0.25$; $W1_2 = 0.50$; $W2_2 = 0.50$; $W1_3 = 0.25$; $W2_3 = 0.75$ Although the present invention and its advantages have been described in detail, it should be understood that various changes, substitutions and alternations can be made herein without departing from the spirit and scope of the invention as defined by the appended claims.

I claim:

1. A method for estimating the porosity of a formation using a borehole tool including a neutron source, a near detector and a far detector, the method comprising:
   (a) obtaining a near count rate in water;
   (b) obtaining a far count rate in water;
   (c) obtaining a near count rate in the formation and a corresponding far count rate in the formation;
   (d) subtracting the near count rate in water from the near count rate in the formation to form an adjusted near count rate;
   (e) subtracting the far count rate in water from the far count rate in the formation to form an adjusted far count rate; and
   (f) estimating a formation porosity value as a function of the adjusted near count rate and the adjusted far count rate.

2. The method of claim 1, wherein (f) further comprises applying a transfer function to the adjusted near count rate and the adjusted far count rate, wherein the transfer function is determined, at least in part, by measuring matched pairs of near count rates and corresponding far count rates in formations having known porosities.

3. The method of claim 2, wherein (f) includes applying the transfer function to a ratio of the adjusted near count and the adjusted far count rate.

4. The method of claim 1, wherein (f) yields a first estimated formation porosity value as a first function of the adjusted near count rate and the adjusted far count rate, the method further comprising:
   (g) estimating a second estimated formation porosity value as a second function of the near count rate and the far count rate; and
   (h) computing a third estimated formation porosity value as a function of the first and second estimated formation porosity values.

5. The method of claim 4, wherein (h) includes averaging the first and second estimated formation porosity values to obtain the third estimated formation porosity value.

6. The method of claim 4, wherein (h) includes applying selected weighting factors in expressing the third estimated formation porosity value as a function of the first and second estimated formation porosity values.

7. The method of claim 6, wherein the weighting factors are selected according to predetermined ranges of formation porosity values.

8. The method of claim 7, wherein the ranges are determined based on the first estimated formation porosity value.

9. The method of claim 7, wherein the ranges are determined based on a preselected function.

10. The method of claim 7, wherein the ranges are determined based on the second estimated formation porosity value.

11. The method of claim 7, wherein the ranges are determined based on an average of the first and the second estimated formation porosity values.

12. A system to measure porosity of a formation, comprising:
    a dual detector neutron tool, the tool disposed to measure a near count rate in the formation and a corresponding far count rate in the formation; and
    a processing unit, the processing unit is communicatively coupled to the tool, the processing unit having access to a near count rate for the tool in water and a far count rate for the tool in water, the processing unit further disposed to:
    (a) receive the near count rate in the formation and the corresponding far count rate in the formation;
    (b) subtract the near count rate in water from the near count rate in the formation to form an adjusted near count rate and to subtract the far count rate in water from the far count rate in the formation to form an adjusted far count rate; and
    (c) estimate a formation porosity value as a function of the adjusted near count rate and the adjusted far count rate.

13. The system of claim 12, wherein the processing unit is further disposed in (c) to apply a transfer function to the adjusted near count rate and the adjusted far count rate, wherein the transfer function is determined, at least in part, by measuring near count rates and corresponding far count rates in formations having known porosity.

14. The system of claim 13, wherein the transfer function is to be applied to the ratio of the adjusted near count rate and the adjusted far count rate.

15. The system of claim 12, wherein (c) yields a first estimated formation porosity value as a first function of the adjusted near count rate and the adjusted far count rate, and wherein the processing unit is further disposed to:
    (d) estimate a second estimated formation porosity value as a second function of the near count rate and the far count rate; and
    (e) compute a third estimated formation porosity value as a function of the first and second estimated formation porosity values.

16. The system of claim 12, further comprising:
    a storage device, the storage device communicatively coupled to the processing unit and disposed to store the formation porosity value estimated in (c).

17. The system of claim 12, wherein the tool is disposed to be deployed in a borehole.

18. The system of claim 12, wherein the processing unit receives the near count rate in the formation and the corresponding far count rate in the formation in the form of logging data.

19. The system of claim 12, further comprising:
    a housing, the tool and processing unit deployable in the housing.

20. The system of claim 19, wherein the housing is included in a drill collar.

21. A processing unit for estimating porosity of a formation, the processing unit comprising:
a memory to store a body of electronic information, the electronic information including a near emitted-particle count rate in the formation, a corresponding far emitted-particle count rate in the formation, a near emitted-particle count rate in substantially 100% porosity, a corresponding far emitted-particle count rate in substantially 100% porosity, a program code and program data; and
one or more processors communicatively coupled to the memory and configured to retrieve and process the electronic information;
wherein the program code and the program data are configured to direct the one or more processors to:
(a) receive the near emitted-particle count rate in the formation and the corresponding far emitted-particle count rate in the formation;
(b) subtract the near emitted-particle count rate in water from the near count rate in the formation to form an adjusted near emitted-particle count rate and to subtract the far emitted-particle count rate in water from the far emitted-particle count rate in the formation to form an adjusted far emitted-particle count rate; and
(c) estimate a formation porosity value as a function of the adjusted near emitted-particle count rate and the adjusted far emitted-particle count rate.

22. The processing unit of claim 21, wherein the body of electronic information further comprises a transfer function, and wherein the program code and the program data are further configured to direct in (c) the one or more processors to apply the transfer function to estimate the formation porosity value, and wherein the transfer function is determined, at least in part, by measuring a near emitted-particle count rates and corresponding far emitted-particle count rates in formations having known porosity.

23. The processing unit of claim 21, wherein (c) yields a first estimate of formation porosity value as a function of the adjusted near count rate and the adjusted far count rate, and wherein the program code and the program data are to further configured to direct the one or more processors to:
(d) estimate a second formation porosity value as a second function of the near emitted-particle count rate and the corresponding far emitted-particle count rate; and
(e) estimate a third formation porosity value as a function of the first estimated formation porosity value and the second estimated formation porosity value.

24. The processing unit of claim 21, further comprising:
an interface disposed to receive the near emitted-particle count rate in the formation and the corresponding far emitted-particle count rate in the formation, the interface further coupled to the one or more processors and configured to allow the one or more processors to receive and store in memory the near emitted-particle count rate in the formation and the far emitted-particle count rate in the formation.

25. The processing unit of claim 24, wherein the one or more processors, via the interface, are further configured to receive in real-time the near emitted-particle count rate in the formation and the corresponding far emitted-particle count rate in the formation.

26. The processing unit of claim 24, wherein the one or more processors, via the interface, are further configured to receive logging data, the logging data including the near emitted-particle count rate in the formation and the corresponding far emitted-particle count rate in the formation.

27. The processing unit of claim 26, wherein the interface includes a serial port.

28. The processing unit of claim 26, wherein the interface includes a device adapted to read a computer readable medium.

29. The processing unit of claim 26, wherein the interface includes a floppy diskette reader.

30. A data structure stored in a computer readable medium, the data structure including computed estimates of formation porosity values, the data structure prepared by a process comprising:
(a) obtaining a near count rate in water;
(b) obtaining a far count rate in water;
(c) obtaining a near count rate in the formation and a corresponding far count rate in the formation;
(d) subtracting the near count rate in water from the near count rate in the formation to form an adjusted near count rate;
(e) subtracting the far count rate in water from the far count rate in the formation to form an adjusted far count rate; and
(f) estimating a formation porosity value as a function of the adjusted near count rate and the adjusted far count rate.

31. The data structure of claim 30, wherein in (f) applying a transfer function to the adjusted near count rate and the adjusted far count rate, wherein the transfer function is determined, at least in part, by measuring near count rates and corresponding far count rates in formations having known porosities.

32. The data structure of claim 31, wherein (f) yields a first estimated formation porosity value as a first function of the adjusted near count rate and the adjusted far count rate, and wherein the data structure is further prepared by process comprising:
(g) estimating a second estimated formation porosity value as a second function of the near count rate and the far count rate; and
(h) computing a third estimated formation porosity value as a function of the first and second estimated formation porosity values.

33. A computer program product storeable on a computer readable medium, the computer program product including processor readable logic for directing a processor to estimate formation porosity, the computer program product further including:
program code and program data, the program code and data configured to be loaded into a local memory and to direct the processor to:
(a) obtain a near count rate in water;
(b) obtain a far count rate in water;
(c) obtain a near count rate in the formation and a corresponding far count rate in the formation;
(d) subtract the near count rate in water from the near count rate in the formation to form an adjusted near count rate;
(e) subtract the far count rate in water from the far count rate in the formation to form an adjusted far count rate; and
(f) estimate a formation porosity value as a function of the adjusted near count rate and the adjusted far count rate.

34. The computer readable medium of claim 33, wherein (f) includes the application of a transfer function, and wherein the transfer function is determined, at least in part, by measuring near count rates and corresponding far count rates in formations having known porosities.

35. The computer program product of claim 34, wherein (f) includes applying the transfer function to a ratio of the adjusted near count rate and the adjusted far count rate.

36. The computer program product of claim 33, wherein the near count rate in the formation and the corresponding far count rate in the formation are obtained via a serial port.

37. The computer program product of claim 33, wherein the near count rate in the formation and the corresponding far count rate in the formation are obtained via a further computer readable medium.

38. The computer program product of claim 33, wherein the program data includes the near count rate in water and the far count rate in water.

39. The computer readable medium of claim 33, wherein the near count rate in water and the far count rate in water are to be obtained from a user via a user interface.

40. A method for estimating the porosity of a formation using a borehole tool including a neutron source, a near detector and a far detector, the method comprising:

(a) obtaining a near count rate in water;

(b) obtaining a far count rate in water;

(c) obtaining a near count rate in the formation and a corresponding far count rate in the formation;

(d) subtracting the near count rate in water from the near count rate in the formation to form an adjusted near count rate;

(e) subtracting the far count rate in water from the far count rate in the formation to form an adjusted far count rate; and (f) estimating a first estimated formation porosity value as a first function of the adjusted near count rate and the adjusted far count rate.

(g) estimating a second estimated formation porosity value as a second function of the near count rate and the far count rate; and (h) computing a third estimated formation porosity value as a function of the first and second estimated formation porosity values and selected weighting factors.

* * * * *